A. T. MacKENZIE.
COOKING UTENSIL.
APPLICATION FILED FEB. 10, 1910.
987,386.
Patented Mar. 21, 1911.
2 SHEETS—SHEET 1.
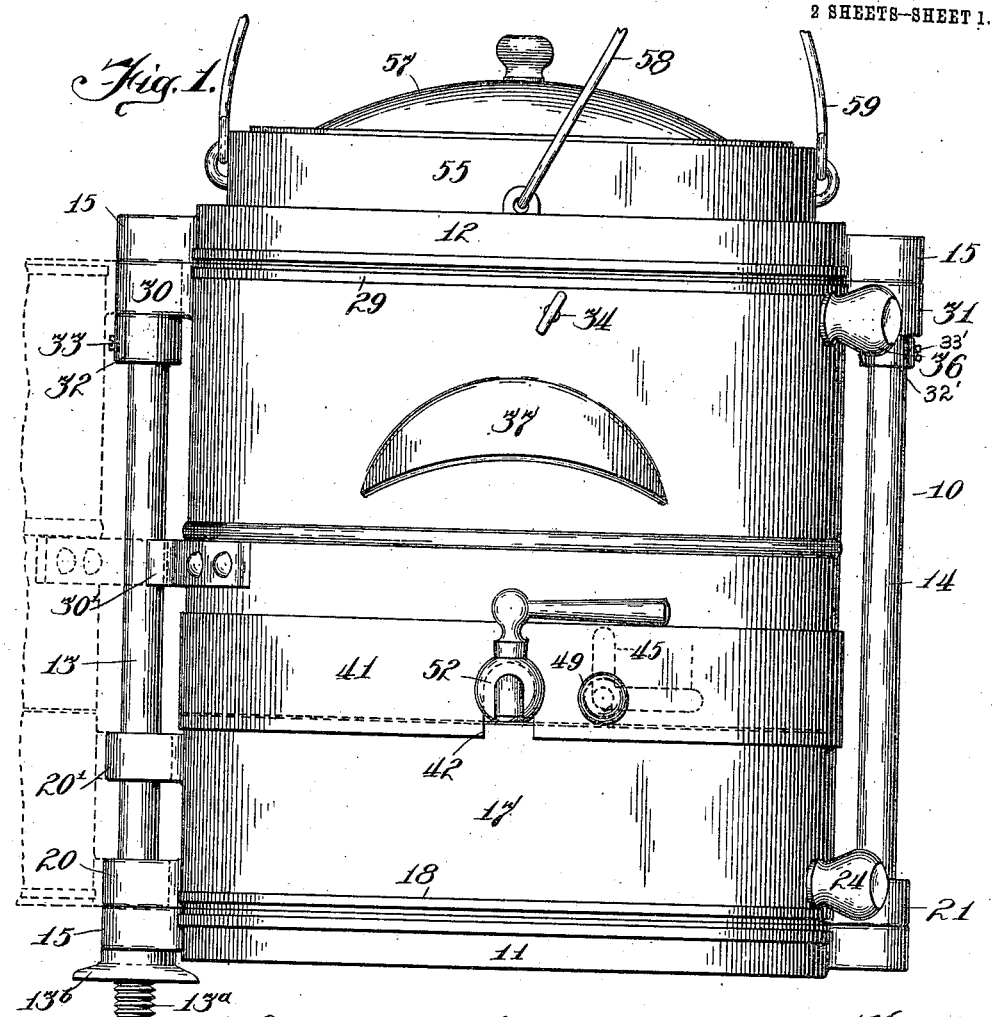
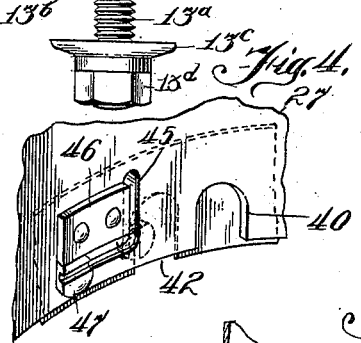
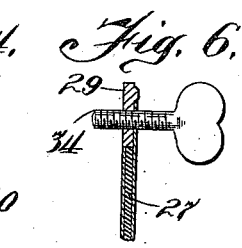
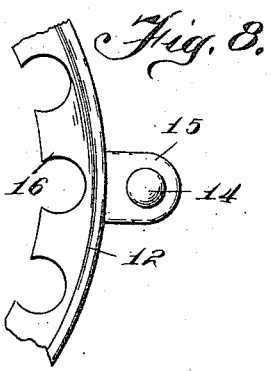
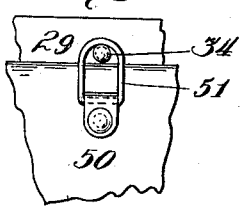
Witnesses
Inventor
Alfred T. MacKenzie
Attorneys.

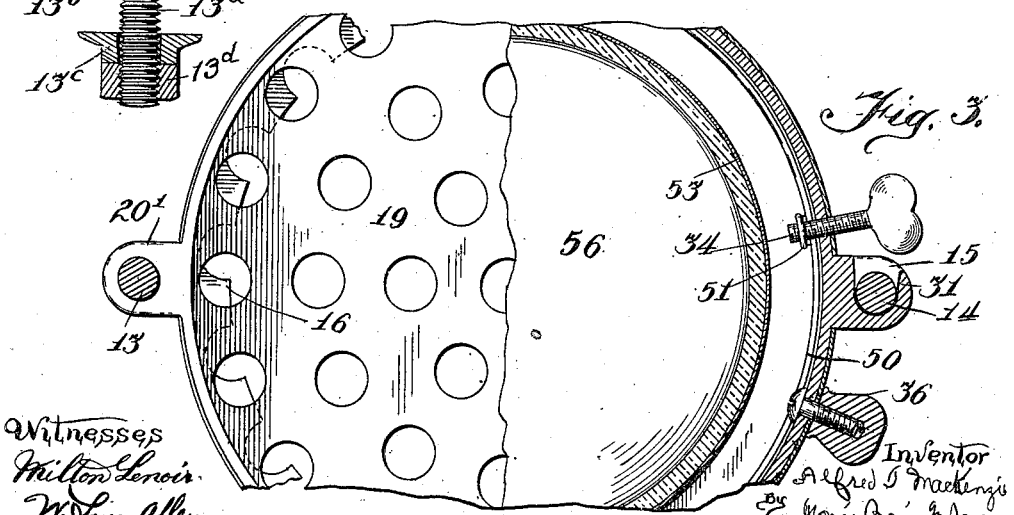

UNITED STATES PATENT OFFICE.

ALFRED T. MacKENZIE, OF CHICAGO, ILLINOIS.

COOKING UTENSIL.

987,386.  Specification of Letters Patent.  Patented Mar. 21, 1911.

Application filed February 10, 1910. Serial No. 543,095.

*To all whom it may concern:*

Be it known that I, ALFRED T. MACKENZIE, a citizen of the United States, residing at South Chicago, in the county of Cook and State of Illinois, have invented certain new and useful Improvements in Cooking Utensils, of which the following is a specification.

My invention relates to improvements in cooking utensils, and has for its salient object to provide a cooking utensil whereby several articles may be heated while superposed one upon the other, to utilize the heat from any suitable source to the best advantage.

Other objects of my invention are to provide a construction which is simple, cheap, and easily operable to meet various conditions of use, so that it may have wide adaptability as a household utensil.

In the drawings, illustrating an embodiment of my invention, Figure 1 is a side elevation; Fig. 2 is a central vertical section; Fig. 3 is a broken section on line 3—3 of Fig. 2; and Figs. 4, 5, 6, 7, and 8, are details.

In the embodiment of my invention shown in the drawings, I provide a strong frame, 10, consisting in the construction shown, of a base ring, 11, and a top ring, 12, connected by upright rods, or posts, 13 and 14, threaded into or otherwise secured to projecting ears, 15, on diametrically opposite sides of the two rings, these parts generally constituting a frame. The upper and lower rings or annuli, 11 and 12, may be of like construction, for cheapness, each said ring being preferably provided with a series of inwardly projecting fingers, 16, constituting an interrupted flange. One post, 13, I preferably extend, as at 13ª, and mount upon the threaded extension clamp washers, 13ᵇ, 13ᶜ, and a nut, 13ᵈ, whereby the frame may conveniently be attached to the top of a gas stove or the like.

Upon one of the posts, which I will for distinction call the rear post, 13, I pivotally mount to be swung into or out of alinement with the casing rings, one or more casing members within or upon which articles to be heated may be placed, the ability of said casing member or members to swing out of register with the frame enabling easy access to be had to the interior of such casing members. In the specific construction shown, 17 indicates in general one such casing member, preferably comprising a bottom band, 18, having a perforated bottom wall, 19, and having connected to opposite sides thereof, as integral parts of the band structure, a hinge member, 20, engaging post member, 13, and a latch stud, 21, (like stud 31, hereafter described) for engagement with the front post, 14. The ring or band, 18, carries a wall, 22, of the casing member, which may, if desired, be made up, as shown of concentric metal walls 22′ interlined with asbestos 22″, the upper edge of the casing wall, 22, being strengthened preferably by a ring, 23, which may also be provided with a handle, 24, and an integral hinge member 20′ alining with hinge member 20. It will be apparent from the construction thus far described that the casing member is capable of being swung toward the observer in Fig. 1, to a position where it stands outside of the frame, and enables articles easily to be inserted in or removed from the casing member.

Above the first casing member, 17, I preferably arrange a second casing member, 27, preferably of greater vertical depth than the first casing member, and preferably having its wall constructed of a double thickness of metal interlined with asbestos as heretofore described, the interspace between the walls of the lower extremity of the upper casing member 27 being strengthened by a metallic band, 28. The upper casing wall is preferably detachably mounted upon a top supporting ring, 29, provided with a hinge-ear, 30, connected to the post, 13, and a latching stud 31 for engagement with post 14.

32 is a collar slidable upon the post 13 and secured thereto as by a set screw 33, to support hinge ear 30, like parts 32′ and 33′ being provided on the front rod 14, for purposes to be hereinafter described. A bearing block, 30′, may likewise be provided upon the casing wall, 27, to bear against the proximate surface of the rod, 13.

The casing wall is preferably attached to the supporting ring, 29, by means of wing screws, 34, extending in through the casing wall and the ring 29 projecting somewhat into the interior of the casing, as best shown in Figs. 2 and 6. The upper casing member 27, as best shown in Fig. 1, is provided with a suitable handle, 36, similar to the handle 24, for swinging the receptacle open and shut and with a lifting handle, 37. It will be apparent that by detaching the screws, 34, from their apertures in the ring, 29, the entire upper casing member with its half-hinge, 30', may be removed at pleasure, and when the upper casing wall is so removed the collar, 32, below the hinge 30 and the supporting ring, 29, may be dropped and the supporting ring, 29, lowered to any desired distance above the lower casing wall.

Preferably the upper casing wall, 27, has made in its bottom a notch, 40, for a purpose to be described, and upon said upper casing wall is provided an annular exterior band, 41, having a similar notch 42 therein, the band being movable vertically and peripherally upon the exterior of the upper casing. This band 41 may be lowered to overlie the joint between the upper and lower wall structures so connecting said casing members for movement as a unit or it may be raised to free them for independent movement, and likewise by its circumferential movement it may bring the notches 40 and 42 into or out of register. In order simply to accomplish this result, I provide an angular slot, 45, in the casing wall, 27, as shown in Fig. 4, and in dotted lines, in Fig. 1, and mounted adjacent to said slot a guide block, 46, against the guiding surfaces of which may abut the flat side of a bolt head, 47, the stem 48 of which projects through the band, 41, and carries a thumb nut, 49. Obviously, when the nut 49 is loosened, the bolt may slide in the annular slot, 45, and the band, 41, moving therewith may be shifted, and then clamped in any desired position within its range of movement by turning of the thumb nut, 49.

The particular receptacle which may be used with the frame and casing construction described may vary widely in character, but I preferably provide a vessel, 50, adapted for suspension wholly within and spaced apart from the upper casing member, 27, said vessel being provided with suspension links, 51, arranged for engagement with the internally projecting screw ends, 34, and preferably with a faucet, 52, projecting through opening, 40—42, aforesaid. I also preferably provide a second receptacle, 53, provided with a flange ring, 54, so that the vessel rests within the outer receptacle, 50, both said vessels, 50 and 53, being preferably metallic. I also preferably provide a porcelain or crockery vessel, 56, likewise exteriorly flanged, as at 55, and arranged to nest tightly within the metallic vessel, 53, or independently of said vessel to seat upon the fingers, 16, of the upper ring, said porcelain vessel having a cover, 57, and both the metallic vessel, 53, and the porcelain vessel, 56, being provided with suitable handles, as at 58 and 59, respectively.

It will be understood that the particular arrangement and construction of vessels described are regarded as convenient refinements of my invention and not essential to the attainment of some of its benefits.

It will be observed that in use, the structure may be clamped to a gas stove by the clamping parts, $13^a$, $13^b$, $13^c$, and $13^d$, so as to be capable of being swung over or away from a burner, or the clamping mechanism may be removed or omitted and the device stood upon its base ring to receive heat from any suitable source. Heat supplied to the interior of the utensil ascends through the casing, the lower member, 17, of which forms a convenient chamber for receiving baking dishes, flat irons, or the like to be heated while the upper portion receives any one or all of the several receptacles described. Obviously the outer receptacle 50 may be filled with water and either of the inner receptacles, 53 or 56, used after the fashion of a double boiler, or the receptacle 50 may be removed outright and the receptacles 53 and 56 used as a roaster, or the entire upper casing wall may be removed and the supporting ring, 29, thrown to any suitable position to serve as a support for any pan or article to be heated, and the top ring 15 likewise used as a support for any article too large for insertion within the frame. Obviously, when the lower casing member, 17, and the upper receptacle alone are in use, the raising of the band 41 enables either of the sections of the casing wall to be swung pivotally to position outside of the frame to permit of inspection or removal of the contents of such compartment, and under any of the above described conditions, the lower compartment may be so opened.

While I have herein described in some detail a particular embodiment of my invention, it will be apparent that such embodiment is given only for purposes of full disclosure of the invention and that the invention in its broader aspect is not limited to such embodiment further than is defined in the following claims.

What I claim is:

1. In a cooking utensil, a frame consisting of two upright rods, upper and lower ring members, arranged in alinement between said rods, each with a pair of ears secured to the rods, and a circular casing member, of diameter corresponding with the rings, pivoted to one of said rods to be swung into or out of register with said rings, and said casing having a perforated bottom.

2. In a cooking utensil, a frame comprising a lower ring, rods extending upward therefrom, a lower casing arranged to hinge upon one of said rods, for presentation within or without the frame, and an upper casing open at its top and bottom arranged for like movement above the lower casing.

3. In a cooking utensil, upper and lower rings, and vertical connecting rods, forming a frame, and a casing, comprising a continuous peripheral wall corresponding with the frame rings and a perforated bottom, hinged to one of said rods for movement into or out of register with the frame rings.

4. In a cooking utensil, upper and lower rings, and vertical connecting rods, forming a frame, a lower casing arranged to hinge upon one of said rods for presentation within or without the frame, and an upper casing wall arranged for like movement above the lower casing, said upper casing wall being detachable from the frame.

5. In a cooking utensil, a frame comprising a lower ring and rods extending upward therefrom, a lower casing arranged to hinge upon one of said rods for presentation within or without the frame, an upper casing arranged for like movement above the lower casing, and a band on one of said casings for joining the casings for movement as a unit, adjustable to permit independent movement of said casings.

6. In a cooking utensil, a frame comprising a lower ring, an upper ring and upright rods connecting said rings, a casing-supporting ring hinged to and vertically adjustable on one of said rods, a casing member detachably carried by said supporting ring, and a second casing member below the first pivotally connected to one of said rods.

7. In a cooking utensil the combination of a frame comprising an upper ring, provided with inwardly projecting fingers for the reception of a vessel to be heated, a lower ring, and upright rods connecting said rings; and a casing adapted to hinge on one of said rods for presentation within or without the frame.

8. In a cooking utensil, a frame comprising a lower ring and upright rods secured thereto, a casing adapted to hinge upon one of said rods for presentation within or without the frame, said casing having a perforate bottom and conforming in contour to the lower ring, and a supporting ring member adjustable vertically upon said rods above the said casing.

9. In a cooking utensil a frame, comprising upper and lower rings and upright rods therebetween, said upper ring being provided with inwardly projecting fingers to receive a vessel and to permit the passage of heated air between the fingers around and above said vessel, a lower casing member between said rings arranged to hinge upon one of said upright rods, for presentation within or without the frame, and an upper casing member arranged for like hinging movement with respect to the frame, said upper casing member being bodily detachable from the frame and being provided internally with means to support a vessel.

10. In a cooking utensil, the combination with a frame comprising top and bottom ring members and connecting rods therebetween, of a plurality of superposed casing members, each pivoted to one of the rods and arranged for independent pivotal movement into or out of register with the frame, and means for connecting said members for movement together.

11. In a cooking utensil, the combination with a frame comprising top and bottom members and connecting rods therebetween, of a plurality of superposed casing members each pivoted to one of the rods, a vessel suspended within the upper casing member, free from the wall thereof, and nesting vessels supported upon the top frame member, extending down into the said suspended vessel.

In testimony whereof I hereunto set my hand in the presence of two witnesses.

ALFRED T. MacKENZIE.

In the presence of—
W. LINN ALLEN,
MARY F. ALLEN.

---

Copies of this patent may be obtained for five cents each, by addressing the "Commissioner of Patents, Washington, D. C."